Sept. 4, 1934.   R. W. GILBERT   1,972,141

POTENTIOMETRIC INDICATOR

Filed Jan. 18, 1933

INVENTOR
Roswell W. Gilbert
BY
Pennie, Davis, Marvin & Edmonds.
ATTORNEYS

Patented Sept. 4, 1934

1,972,141

UNITED STATES PATENT OFFICE 1,972,141

POTENTIOMETRIC INDICATOR

Roswell Ward Gilbert, Neshanic, N. J.

Application January 18, 1933, Serial No. 652,327

7 Claims. (Cl. 175—183)

This invention relates to automatic potentiometric balancing and indicating apparatus adapted more particularly to the measurement of small voltage changes.

In one of its modifications the invention finds utility in recording pyrometry, etc. for measuring voltage changes of thermocouples, photo-electric cells, or the like, exposed to temperature or radiant energy variations.

In another of its modifications the invention has possibilties in the automatic measurement of changes in resistance as encountered in resistance pyrometers, certain weighing devices, electrolytic variation of industrial solutions or analogous uses.

It is generally conceded that the measurement of small potentials such as are encountered in thermo-electric couples or photo-electric cells is best accomplished through the medium of a potentiometric balance. This method by substantially preventing current flow in the couple or cell circuit for the condition of balance eliminates sources of error such as otherwise might result from resistance changes.

Instruments now in use for the automatic measurement of small voltages by potentiometric methods, such as recording pyrometers, resort to intricate and delicate mechanical devices that are expensive and require excessive care. Recording pyrometry would undoubtedly be more extensively employed in the industries were these objectionable features overcome through the production of a simple, rugged and reliable device.

It is the purpose of the present invention to provide such a device, employing but a single mechanically movable element of simple and rugged construction for the automatic maintenance of a potentiometric balance, and the amplifying action of an electronic device to provide a comparatively powerful operating current varying in direct proportionalty with the potential changes of the couple or photo-cell for operation of the indicating or recording apparatus.

Figure 1:
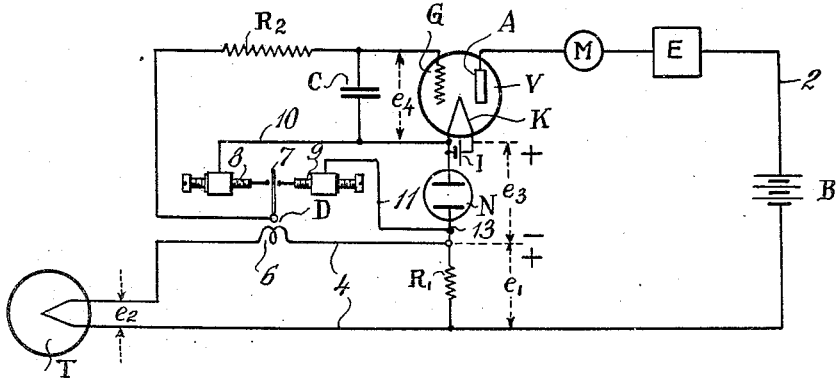
Fig. 1 shows diagrammatically the invention as applied to the automatic indication of voltage changes in thermocouples, photo-electric cells, etc.

Referring to Fig. 1 there is shown a thermionic tube V having an anode A, a grid or control electrode G, and a cathode K energized from any suitable source, such as battery 1. The space path of the tube is energized from source B interposed in connection 2 extending from the anode A to the cathode K through a fixed resistance $R_1$ and the space path of a glow discharge tube N, such as a neon tube.

Connected in parallel with resistance $R_1$ over conductors 4 is a thermo-couple or photo-electric cell circuit T so poled that the generated voltage of element T opposes the voltage drop due to the flow of space current of tube V through resistance $R_1$.

Interposed in the upper conductor 4 is the winding 6 of a polarized relay D, provided with an armature 7 movable between contacts 8 and 9. A connection 10 extends from the contact 8 directly to the cathode K, and a connection 11 from contact 9 to a point 13 in the anode connection 2 situated between the glow discharge tube N and resistance $R_1$. Armature 7 is in turn connected to the grid G through a resistance $R_2$. A condenser C controlling by its charge the grid potential of the tube is connected directly between grid G and cathode K. For indicating the voltage changes of element T, a milliammeter M, and also, if desired, a recorder E may be interposed in the anode circuit 2 of the tube.

Consider now the operation of the Fig. 1 circuit to measure changes in the voltage $e_2$ generated by element T. Assume initially the apparatus to be in balance with the armature 7 of relay D in its neutral position as shown. The balance will obviously be maintained only so long as the voltage $e_1$ due to the flow of the space current of tube V through resistance $R_1$ is equal to the voltage $e_2$ of element T to be measured.

Cause the voltage $e_2$ to decrease slowly as by decreasing the temperature of or radiant energy delivered to element T. When the condition $e_2$ is less than $e_1$ ensues, the voltage difference $e_1-e_2$ causes an unbalanced current to flow through the winding 6 of relay D thereby operating armature 7 against its right hand contact 9. This completes a circuit for applying the negative potential of point 13 relative to the cathode K due to the voltage drop $e_3$ across the neon tube N, across resistance $R_2$ in series with condenser C. As condenser C charges up slowly through resistance $R_2$, the resulting increasingly negative potential of the grid G reduces the space current of the tube until the voltage $e_1$ due to the current drop through resistance $R_1$ again equals the new voltage $e_2$ of element T, whereupon the flow of unbalance current through the winding 6 of relay D ceases and the armature 7 returns to neutral. The accumulated charge on condenser C maintains the system in balance.

Now cause the voltage $e_2$ of element T to increase until it exceeds appreciably the current drop $e_1$ across $R_1$. The resulting potential difference $e_2-e_1$ causes an unbalance current of opposite polarity from that first mentioned to flow through winding 6 of relay D, as a consequence of which armature 7 operates against its left hand contact 8. This completes a circuit for condenser C to discharge slowly through resistance $R_2$. The resulting decrease in negative potential of the grid G relative to the cathode permits the space current of the tube to increase until the current drop $e_1$ through resistance $R_1$ again equals voltage $e_2$, whereupon relay D returns to neutral to maintain this system in this new condition of balance.

It will be apparent from the above explanation that the operation described depends in no way upon the shape of the grid voltage—plate current characteristic of tube V. For the condition of balance there exists at all times a direct proportionality as determined by the magnitude of resistance $R_1$, between variations in the voltage $e_2$ of element T and the resulting changes in the anode current flowing through the indicating meter M and recorder E.

The comparatively heavy anode current of tube V varying in direct proportionality to the voltage changes of element T, permits the use of a measuring device of rugged and economical construction. Also since the polarized relay D, which is essentially a D'Arsonval galvanometer, can readily be constructed to have a sensitivity of the order of a microampere and still be rugged and serviceable, it will be seen that the system of Fig. 1 eliminates in large degree the disadvantage of existing recording pyrometers, such as have heretofore been pointed out. The variation in plate current can be made sufficiently large to operate alarm drops, several recorders, or auxiliary apparatus.

Although the glow discharge tube may be replaced by a resistance as a medium for providing a negative potential to charge condenser C, the former is preferable due to its peculiar property of maintaining the voltage drop $e_3$ within narrow limits for relatively wide fluctuations in space current. This stabilizes the lag of the apparatus in responding to changes in voltage $e_2$. Values of $R_2$ and C may be selected to give a time lag of about five seconds per millivolt change in $e_2$, which is entirely satisfactory for actuating recording apparatus or even for direct reading.

In practice, if $e_2$ remains constant for long intervals the armature 7 of relay D will periodically contact to the right to recoup the charge on condenser C lost through unavoidable leakage, and thereby to restore the requisite balance between voltages $e_1$ and $e_2$. This action does not disturb the normal functioning of the apparatus.

Figure 2:
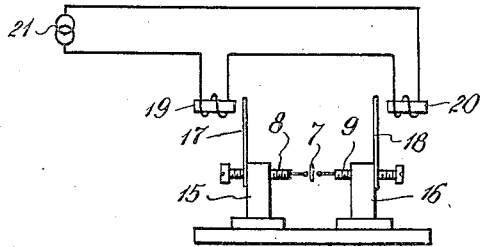
Fig. 2 shows an arrangement which may be employed to prevent sticking of contacts in the mechanically movable element of the system.

Referring to Fig. 2, any tendency for the armature 7 of relay D to adhere to contacts 8 or 9 may be overcome by rigidly affixing to the respective contact supports 15 and 16, resilient strips 17 and 18, of magnetic material. The strips may be kept in more or less constant vibration of slight amplitude by means of solenoids 19 and 20 connected in series to an intermittent or alternating current source 21. Vibration of members 17 and 18 causes contacts 8 and 9 in turn to vibrate very slightly, in a wiping fashion against armature 7 when in contact therewith, thus preventing any tendency for the contacts to stick.

Figure 3:
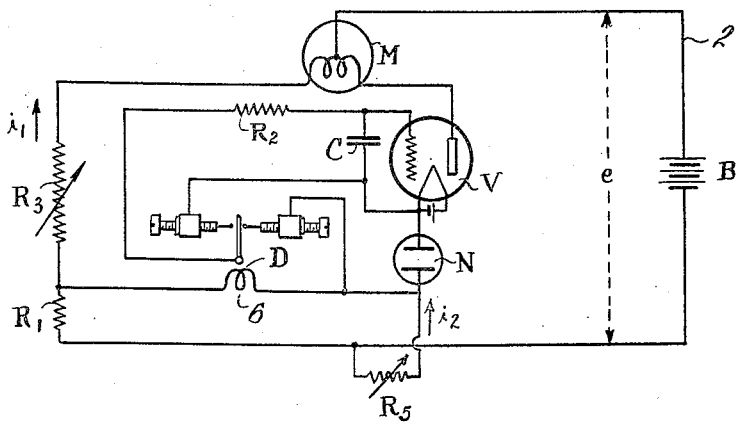
Fig. 3 shows the invention as embodied in an electrical bridge circuit for automatically measuring changes of resistance in one of the balancing arms.

Fig. 3 shows an adaptation of the invention to accurate automatic measurement of resistance variations as encountered for example in resistance pyrometers, electrolytic variations of industrial solutions, etc.

Fig. 3 is essentially a bridge circuit wherein $R_1$ and $R_3$ are balancing arms of fixed resistance, $R_5$ is a balancing arm of variable resistance to be measured. The space path of the glow discharge tube N in series with the space path of the thermionic tube V comprises the remaining balancing arm the total resistance of which may be designated $R_4$. The B battery supply is applied between one pair of conjugate points of the bridge while the winding 6 of the polarized relay D is connected between the remaining pair of conjugate points.

In the circuit of Fig. 3 the action of the polarized relay and tube circuit automatically to maintain the bridge balance at all times is analogous to the operation in the Fig. 1 circuit to maintain a balance between voltages $e_1$ and $e_2$. If in the circuit of Fig. 3, resistance $R_5$ increases or decreases the resulting unbalance current flowing in winding 6 of relay D will be of the proper polarity to so adjust the effective space path resistance of tube V through control of its grid potential as to reestablish a balance in accordance with the equation $$(1) \quad \frac{R_1}{R_3}=\frac{R_5}{R_4}$$

From the laws of operation of bridge circuits it is known that for the condition of balance the currents $i_1$ and $i_2$ flowing in the fixed and variable balancing arms are inversely proportional to the resistances $R_1$ and $R_5$. Since $R_1$ is constant, changes in the value of resistance $R_5$ produce proportional changes in the current difference $i_1-i_2$, i. e.;

$$(2) \quad \Delta R_5 = K \cdot \Delta \cdot (i_1-i_2)$$

where $\Delta$ indicates a change and K is the constant of proportionality. This, of course, is on the assumption that the voltage $e$ is maintained constant.

Changes in the current difference $i_1-i_2$ may conveniently be measured by employing a center tapped milliammeter M, connected as shown in Fig. 3, wherein the instrument automatically indicates the current difference $i_1-i_2$ by concellation of fluxes within the winding. The meter M may of course be calibrated to indicate variations in resistance $R_5$ directly.

I claim:

1. Potentiometric apparatus comprising a thermionic tube, an energizing connection between the anode and the cathode thereof, a circuit interposed in said connection containing a resistance in parallel with an element subject to electrical variation, the voltage across which opposes the voltage across said resistance, a condenser controlling by its charge the grid potential of said tube, and means responsive to unbalances of said opposed voltages for charging or discharging said condenser through resistance automatically to restore a balance.

2. Potentiometric apparatus comprising a thermionic tube, an energizing connection between the anode and the cathode thereof, a circuit interposed in said connection containing a resistance in parallel with a polarized potential subject to variation, the voltage of which opposes the voltage across said resistance, a condenser controlling by its charge the grid potential of said tube, and means responsive to unbalances of said opposed voltages for charging or discharging said condenser through resistance automatically to restore a balance.

3. An electrical bridge the balancing arms of which comprise respectively a pair of fixed resistances, a resistance subject to variation, and the space path of a thermionic tube, a condenser controlling by its charge the grid potential of said tube, an energizing connection between one pair of conjugate points of said bridge, and means across the remaining conjugate points responsive to potential unbalances thereof for charging or discharging said condenser through resistances automatically to restore a balance through variation in the space path resistance of said tube.

4. Potentiometric apparatus comprising a thermionic tube, an energizing connection between the anode and the cathode thereof, a circuit interposed in said connection containing a resistance in parallel with an element subject to electrical variation the voltage across which opposes the voltage across said resistance, a condenser controlling by its charge the grid potential of said tube, means responsive to unbalances of said opposed voltages for charging or discharging said condenser through resistance automatically to restore a balance, and means in said anode connection for indicating conditions of balance.

5. A device for measuring small voltage changes comprising a thermionic tube, an energizing connection between the anode and the cathode thereof, a resistance in said connection and a glow discharge tube therein adjacent said cathode, a connection in shunt to said resistance containing a polarized voltage source subject to variation and poled in opposition to the voltage across said resistance, a condenser controlling by its charge the grid potential of said tube, and means including a polarized relay responsive to unbalances of said opposed voltages, and connections from respective contacts thereof to the grid of said tube and to a point between said resistance and glow discharge tube for charging or discharging said condenser through resistance to restore a balance.

6. A device for measuring small voltage changes comprising a thermionic tube, an energizing connection between the anode and the cathode thereof, a resistance in said connection and a glow discharge tube therein adjacent said cathode, a connection in shunt to said resistance containing a polarized voltage source subject to variation, poled in opposition to the voltage across said resistance, a condenser controlling by its charge the grid potential of said tube, and means including a polarized relay responsive to unbalances of said opposed voltages, connections from respective contacts thereof to the grid of said tube and to a point between said resistance and glow discharge tube, for charging or discharging said condenser through resistance to restore a balance, and means in said anode connection for indicating conditions of balance.

7. Potentiometric apparatus comprising a thermionic tube, an energizing connection between the anode and the cathode thereof, a circuit interposed in said connection containing a resistance in parallel with an element subject to electrical variation, the voltage across which opposes the voltage across said resistance, a condenser controlling by its charge the grid potential of said tube, and means responsive to unbalances of said opposing voltages for charging or discharging said condenser electrically to restore a balance.

ROSWELL WARD GILBERT.